United States Patent Office 3,769,322
Patented Oct. 30, 1973

3,769,322
CONTINUOUS PROCESS FOR PRODUCTION OF
BIS (β-HYDROXYETHYL)-TEREPHTHALATE
Kisaburo Yamagami, Kichiji Enoki, and Toshiyuki Tani, Takaoka, Shiro Akimoto, Tonami, and Jiro Futakuchi and Hajimo Tayagaki, Takaoka, Japan, assignors to Nippon Soda Kabushiki Kaisha, Tokyo-to, Japan
Continuation of abandoned application Ser. No. 693,930, Dec. 27, 1967. This application Jan. 29, 1971, Ser. No. 111,129
Claims priority, application Japan, Dec. 30, 1966, 42/85,805; Jan. 21, 1967, 42/3,868; Mar. 17, 1967, 42/16,389
Int. Cl. C07c 69/82
U.S. Cl. 260—475 P     8 Claims

ABSTRACT OF THE DISCLOSURE

A continuous process for the production of bis(β-hydroxyethyl)-terephthalate comprising reacting a substantially solvent-free mixture consisting of terephthalic acid and ethylene oxide in a reactor constructed with a cylindrical double shell and having a rotor provided with an agitator and/or scrapers for scraping the heat exchanger, and recovering the reaction product from the reactor in powder or solution form.

---

This application is a continuation of abandoned application Ser. No. 693,930 filed Dec. 27, 1967.

This invention relates to a novel and improved continuous process for the production of bis(β-hydroxyethyl)-terephthalate (hereinafter referred to as BHET). More particularly this invention is concerned with a continuous process for the production of BHET under substantially solvent-free conditions.

The process for the production of BHET, which comprises reacting terephthalic acid with ethylene oxide in the presence of water or an inert organic solvent, is well known. However, the known process is accompanied by many disadvantages such as necessity for the removal of water or solvent from the reaction mixture and refining the solvent, decreased purity and yield of the product and high production cost. In order to overcome the above disadvantages, the reaction of terephthalic acid with at least a stoichiometric amount of ethylene oxide under substantially solvent-free conditions, was proposed.

This invention is directed to carrying out the above process by means of continuous manner in an industrial scale.

To realize this process, the problems due to the high viscosity of the mixture of raw materials must be avoided.

The viscosity of the mixture of the raw materials, which are used in paste or slurry forms, varies over a wide range in accordance with the ratio of terephthalic acid and ethylene oxide or with the bulk density of terephthalic acid. On increasing the ratio of terephthalic acid to ethylene oxide to stoichiometric value, the viscosity of the mixture increases up to several poises even at the elevated reaction temperature. Therefore, the removal of the large amount of the reaction heat and the maintenance of the temperature within the narrow range pose hard problems to solve in the field of chemical engineering.

It is necessary for the successful carrying out of the process to find an adequate method for removing the large quantity of reaction heat, which amounts to 46–50 Kcal/BHET mol.

Such high values are very rare in organic chemical reactions excepting in oxidation reactions, so that the reaction heat can hardly be removed from the reaction mixture by means of the usual apparatus.

A further problem in carrying out this process is the maintenance of the reaction temperature within a suitable narrow range. If the temperature rises above the limitation of 130° C., the reaction tends to get out of control and the rapidly increasing heat generation brings about not only side reactions which cause a deterioration of the purity and yield of the product but may also lead to a dangerous explosion. On the other hand, if the temperature drops below 100° C., the reaction mixture begins to solidify because the melting point of pure BHET is about 110° C., and continuing the reaction is hardly possible. Therefore, in order to obtain highly pure BHET in a good yield by said process, it is necessary to remove the reaction heat as quickly as possible and to maintain the temperature within the narrow permitted range, of for example, 100–130° C. Consequently, in the case of a solvent free process, control of the reaction temperature within the said range is almost impossible in large scale production by the batch type reactor.

Moreover, in order to apply this process in a continuous manner there are additional difficult problems to be solved. One of these is to find an appropriate device for removing the reaction mixture continuously or intermittently from the reaction vessel which is under high pressure to the atmosphere.

In this process, the pressure is usually kept in a range of 15–30 kg./cm.$^2$ in order to maintain the ethylene oxide in the liquid state at the above temperature which is above the boiling point of ethylene oxide. The reaction mixture contains not only BHET but also a considerable quantity of unreacted terephthalic acid and ethylene oxide, because the reaction rate is low, and because the ethylene oxide is used generally in more than stoichiometric quantity to avoid side-reactions and keep the mixture homogeneous. On the other hand, as the melting point of the product BHET is fairly high i.e. 110° C., the reaction mixture tends to solidify below the above temperature.

Consequently, when the reaction mixture under a positive pressure is rapidly blown out to the atmosphere through the conventional reducing valve, the BHET in the mixture is rapidly cooled to below the melting point by the latent heat of evaporation of ethylene oxide and solidifies and together with unreacted terephthalic acid, blocks the valve and pipe line finally stopping the operation.

Still another difficult problem in the continuous process is that insoluble terephthalic acid suspended in the reaction mixture tends to deposit gradually on the inside wall of the reactor or pipe thereby decreasing the heat transfer efficiency and clogging the pipe.

Continuous type apparatus for use in the preparation of BHET have been proposed. For instance, U.S. Pat. 3,052,711 discloses the process which comprises forming BHET by continuously feeding ethylene oxide, terephthalic acid, water and a water soluble base into one end of a tubular reactor at a temperature of 140° C. to 200° C. under pressure.

However, if the above process is applied to the solvent-free process, the heat transference in the reactor is not uniform and is insufficient to remove completely the reaction heat from the reaction mixture, so that the side reaction caused by local overheating can occur increasing the impurities present to a considerable extent whereby the product cannot be used for preparation of fibrous materials without troublesome purification.

In addition to the above, deposition of the terephthalic acid present in the reaction mixture on the walls of the reactor or tube causes much trouble and sometimes clogs the pipe, so that the continuing of a stable operation for long periods becomes impossible.

It is an object, therefore, of this invention to provide a continuous process for the production of highly pure BHET under substantially solvent-free conditions.

An additional object of this invention is to provide a continuous process for the production of BHET which avoids the deposition of terephthalic acid.

Another object of this invention is to provide a process for taking out the reaction mixture in powdered form from the reactor to the atmosphere.

A further object of this invention is to provide a process for taking out the reaction mixture as a solution from the reaction section to the atmosphere without appreciable hydrolysis of ethylene oxide.

In the drawings:

FIG. 3A is a section taken on line A–A' of FIG. 3.

FIG. 4A is a section taken on line A–A' of FIG. 4.

Figure 1:
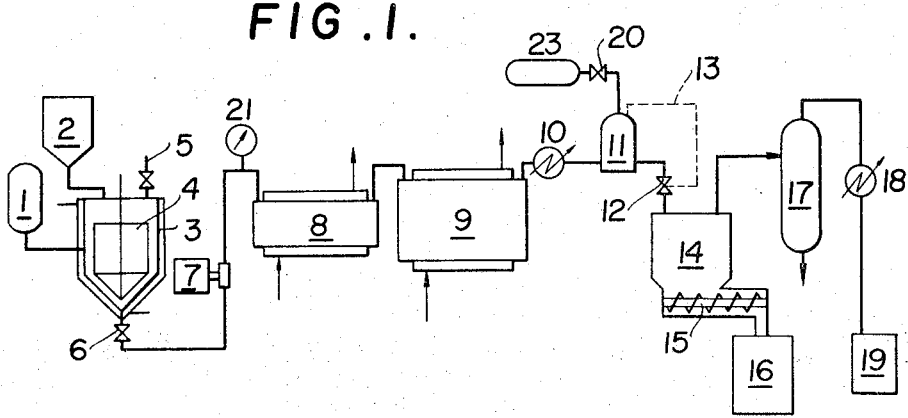
FIG. 1 is a flowsheet diagram of the process of the invention.

Referring to FIG. 1, an ethylene oxide storage tank 1 and terephthalic acid storage tank 2 are connected to mixing tank 3, the outlet of which is connected by feed pump 7 to preheater 8 and reactor 9; an outlet of reactor is connected with heater 10 to seal pot 11. The outlet of the seal pot is connected to receiver 14 which is joined by screw conveyor 15 to product tank 16, via reducing valve 13 which acts in dependence on the level of the reaction mixture in seal pot 11. A vapor phase outlet on top of receiver 14 is connected by a conduit to fractionating column 17, the top of which is connected to ethylene oxide recovery tank 19 via condenser 18.

Terephthalic acid powder in storage tank 2 is charged to a mixing tanks 3 by means of an appropriate device such as a belt or screw conveyor.

Terephthalic acid powder having a high bulk density and a small particle size of less than 100μ is preferably employed to decrease the viscosity of the reaction mixture and to prevent the deposition of large particles of terephthalic acid from the reaction mixture.

Ethylene oxide in storage tank 1 is introduced to mixing tank 3 by means of a pump or by head pressure. The molar ratio of terephthalic acid to ethylene oxide in the mixing tank is from 1:2 to 1:10 and preferably from 1:3 to 1:6. If the terephthalic acid ethylene oxide ratio is less than 1:2, the fluidity of the mixture is lowered causing trouble in the operation, but a ratio of more than 1:10 should not be used because of decreasing the apparatus efficiency.

Catalyst, auxiliary catalyst, and/or solvent are added to the above mixture, if necessary. Conventional catalysts such as organic amines and quaternary ammonium compounds are used.

Mixing tank 3 is provided with an agitator 4 which serves to suspend the terephthalic acid powder in the ethylene oxide as a uniform slurry.

Mixing tank 3 also may be cooled by supplying brine or water to its cooling jacket, if desired, and is sealed with nitrogen supplied through inlet 5.

The slurry in the mixing tank 3 is fed through stop valve 6 into preheater 8 continuously by feed pump 7 having sufficient capacity to overcome the pressure in the reactor and which is provided with a mechanism for adjusting the flow rate.

Figure 2:
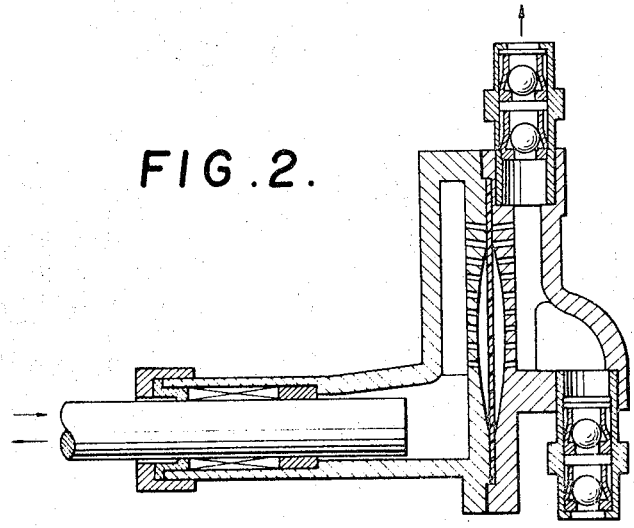
FIG. 2 is a sectional view of one example of feed pump 7 in FIG. 1.

A diaphragm pump or a plunger pump is suitable for rise as a feed pump and one embodiment of a suitable diaphragm pump is shown in FIG. 2. The slurry in preheater 8 is heated to about the reaction temperature by steam or other heat transfer medium in the jacket. Although the type of preheater is not limited, to the embodiment shown, the reactor as described hereinafter is applied conveniently.

The slurry heated in preheater 8 is introduced into reactor 9. The reactor is composed of a cylindrical shell having a rotor therein provided with a device for agitating or scraping against the wall film on the inside surface of the inner shell, said shell having an exterior cooling jacket.

Figure 3:
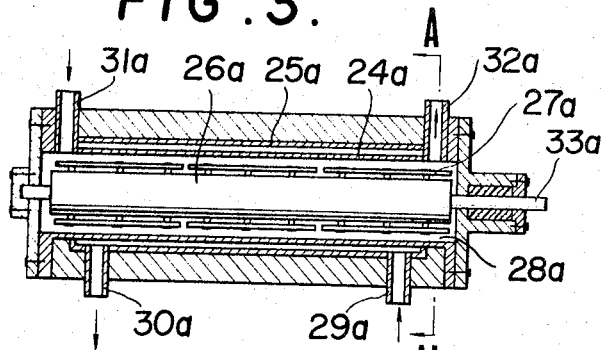
FIG. 3 is a longitudinal sectional view of one form of reactor 9 in FIG. 1.
Figure 4:
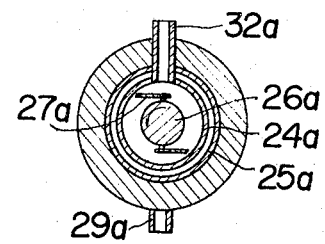
FIG. 4 is a longitudinal sectional view of another form of reactor 9 in FIG. 1.
Figure 4:
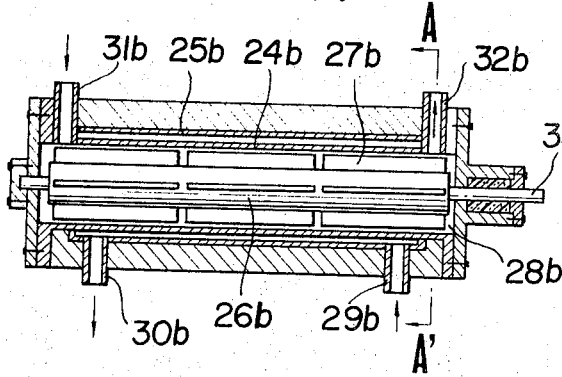

One embodiment of the reactor 9 is shown in FIGS. 3 and 3–A and another in FIG. 4 and 4–A. In FIG. 3, the reactor composed of cylindrical double shell 24a, 25a and rotor 26a fixed on shaft 33, extending almost the entire length of the inner shell and having attached a few rows of blades 27a (in case of FIGS. 3 and 3–A, they are shown as two lines).

Each row of blades is divided into several sections, one end of each which is fixed with pins loosely in a tangential direction to the rotor, and another end of which faces the inside wall of inner shell 24a.

The rotor turns in the direction of the arrow in FIG. 3–A and the rotational speed of the rotor may be maintained at between 200 and 600 r.p.m. depending upon the viscosity of the slurry, the capacity of the reactor and the type of blades.

The slurry introduced continuously from the preheater through pipe 31a is moved in a forward direction through the inner shell toward the discharge pipe 32a. The heat-transfer medium is introduced through pipe 29a and discharged from pipe 30a, and the temperature thereof is maintained at almost the same temperature and preferably at a reaction temperature of between 100 and 130° C.

The length, diameter and actual interior volume of the reactor are considered as are heating area, production rate, flow rate of the slurry, and reaction temperature in determining the retention time, which is usually 20 minutes to 2 hours. The reaction zone may be composed of several reactors connected in parallel or series.

Another type of reactor is shown in FIG. 4, in which like parts to those in FIG. 3 are indicated by like reference numerals and wherein the only difference is in the blades 27b which are fixed in a radial direction on the rotor 26b. The reaction mixture discharged from pipe 32a or 32b is led to seal pot 11 through heater 10 if necessary. In heater 10 the mixture is heated to the temperature at which enthalpy of the mixture is at least beyond the latent heat of evaporation of ethylene oxide in the mixture. The seal pot is composed of a vertical pressure vessel, in which the holding mixture is maintained at the settled level, the upper part being filled with nitrogen providing a buffering action to fluctuations of pressure and flow rate.

When the level of the reaction mixture rises beyond the standard situation, reducing valve 12 is opened automatically by means of float in the seal pot and the reaction mixture is discharged quickly. When the level falls below the standard situation, the reducing valve 12 is closed and the mixture is discharged slowly until the level is restored to the standard situation. The pressure in the reactor section (from pump 7 to seal pot 11) shown by pressure gauge 21 may be varied by varying the pressure of nitrogen in the seal pot by means of regulating valve 20 provided between seal pot 11 and nitrogen bomb 23.

Figure 5:
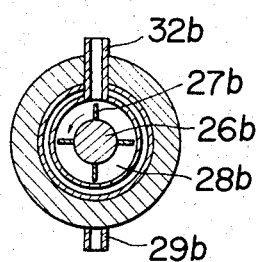
FIG. 5 is one example of a reducing valve 12 in FIG. 1.
Figure 5:
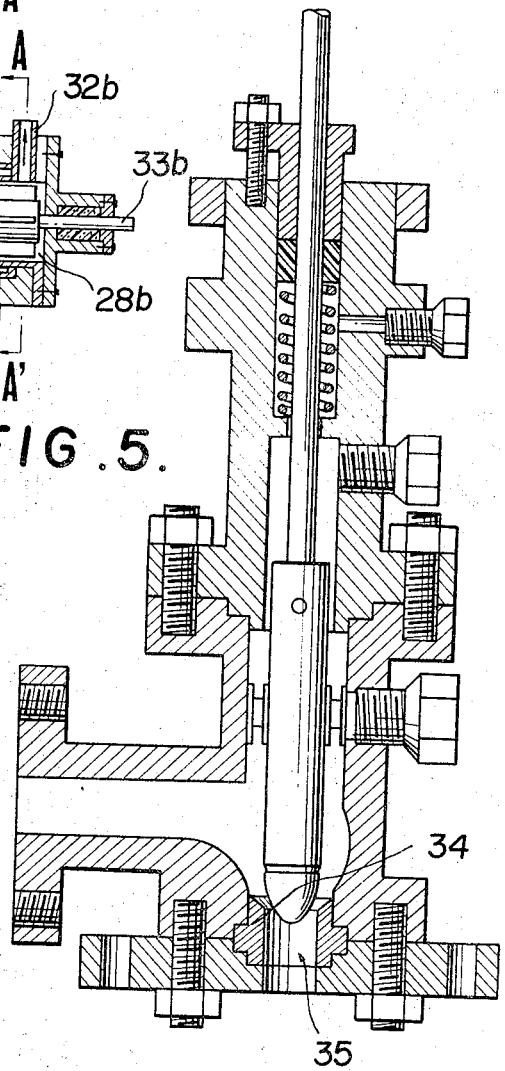

A needle valve having a wide outlet 35 and wide seat ring 34 is used preferably as the reducing valve 12, although the conventional type can also be used. One embodiment of valve 12 is shown in FIG. 5. The reaction mixture in seal pot is sprayed into receiver 14 passing through reducing valve 12, and dispersed into small particles of the product as ethylene oxide evaporates. At the same time, particles are quickly cooled by the latent heat of evaporation of the ethylene oxide.

Ethylene oxide vapor in receiver 14, is conducted to the fractionating column 17 where any solvent is separated if a solvent of low boiling point is then used, and is led to an ethylene oxide recovery tank 19 through condenser 18.

The particles of the product cooled below the melting point are converted into a dry powder substantially free of ethylene oxide, because they had enough enthalpy to evaporate ethylene oxide. The powder is accumulated on the bottom of receiver 14 and discharged to product storage tank 16 by means of screw conveyer 15.

Figure 6:
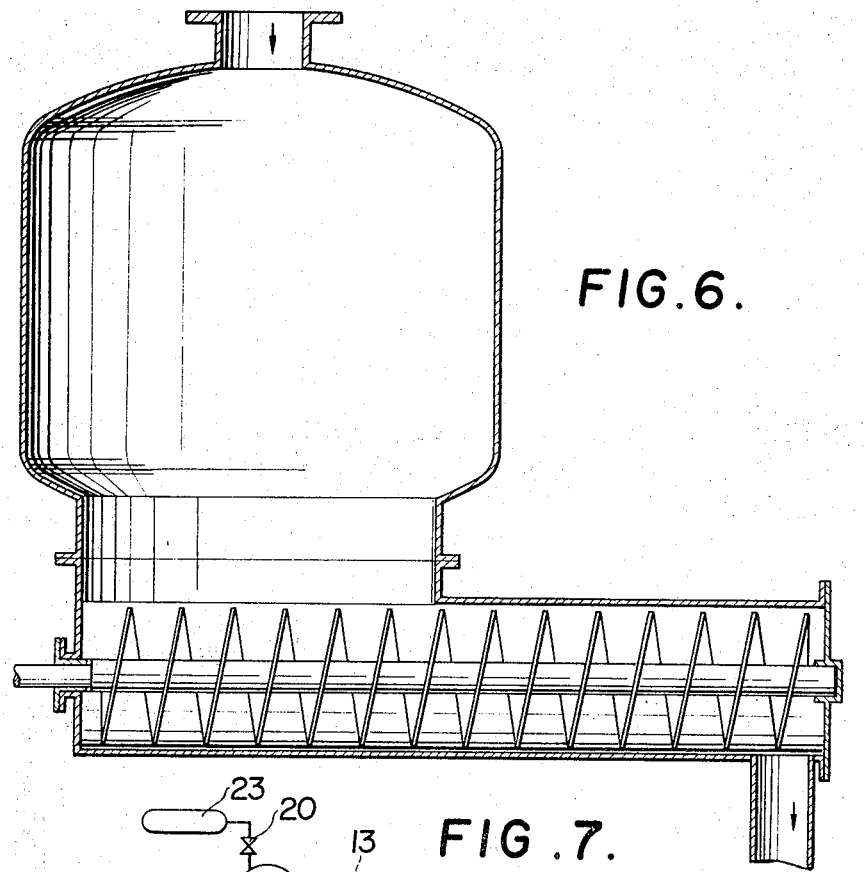
FIG. 6 is one example of a receiver 14 and screw conveyor 15 in FIG. 1.

An embodiment of a combination of the receiver and screw conveyer is shown in FIG. 6.

At this point, the powder is composed mainly of BHET and unreacted terephthalic acid.

The powder is used as raw material in the preparation of polyesters as it is, or may be easily purified by recrystalization from water.

Figure 7:
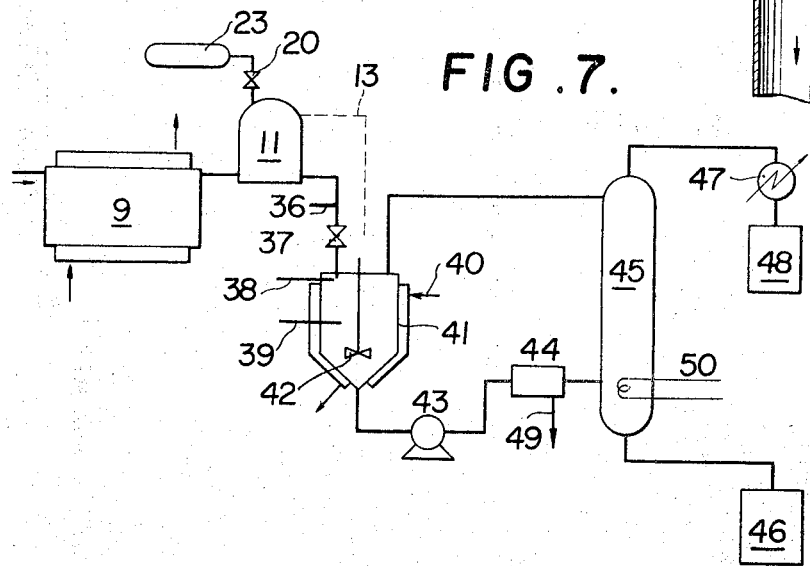
FIG. 7 is another flowsheet diagram of the invention.

The reaction mixture is taken off under a positive pressure into the atmosphere, by the modification shown in FIG. 7. In FIG. 7, the reaction mixture discharged from reactor 9 is directly entered into seal pot 11, the preheater 5 shown in FIG. 1 is then unnecessary. Reducing valve 37 which is not limited to any particular type is provided between the seal pot 11 and the receiver 41 and hot water or steam is introduced through inlet 36 or blown from inlet 38 into the reaction mixture. The quantity of water or steam may be 1.5–4 times the weight of the reaction mixture, and a part of which may be introduced through inlet 39 into the receiver. In this case, the product is obtained as a solution and receiver 41 is provided with agitator 42 to dissolve the reaction mixture in water and heated to maintain a temperature of 70° C. or more by the heat transfer medium circulating in the jacket 40. The vapor phase in receiver 41 is conducted to fractionating column 45 to separate the ethylene oxide from the water and heavy matter, and the ethylene oxide recovered is collected by condenser 47 in a recovery tank 48. The liquid phase filtered out by pump 43 and filter 44 from the suspension if desired, is heated by reboiler 50, and ethylene oxide is further separated therefrom in column 45 and sent to storage tank 46. The solid matter filtered off from the suspension constitutes unreacted terephthalic acid. Highly pure crystaline BHET is obtained from the solution after cooling.

According to this invention, highly pure BHET substantially free of oligomers is easily obtained in good yield in an industrial scale.

EXAMPLE 1

The apparatus shown in FIG. 1 was employed. 450 kg. of terephthalic acid (particle size distribution was mainly in a range of 30–50$\mu$, bulk density is 0.6), 475 kg. of ethylene oxide and 4.5 kg. of triethyl benzyl ammonium chloride were introduced to the mixing tank and mixed together. The slurry was fed to the reactor section at the rate of 1.5 liters/min. by means of diaphragm pump shown in FIG. 2. The reacting section was composed of one preheater and four reactors having a similar structure to that shown in FIG. 3 except that each reactor had four rows of blades instead of two rows. Each reactor had 0.43 m.$^2$ of heating area, and about 9 liters of actual volume. The preheater and each of the reactors were connected in series and the former was maintained at a temperature of 100° C. and the latter at a temperature of 105–110° C. by passing heat-transfer medium through the heating jackets.

The pressure in the reactor section was maintained at about 20 kg./cm.$^2$ by regulating the operation of the seal pot and reducing valve. The retention time of the reaction mixture in the reactor section was 27 minutes and the mixture was sprayed to the receiver passing through the reducing valve shown in FIG. 5.

In the receiver, the mixture sprayed as particles was cooled to about 20° C. accompanied by evaporation of ethylene oxide and the product consisted of 72.6% of bis-($\beta$-hydroxyethyl)-terephthalate, 26.9% of unreacted terephthalic acid and was substantially 0.5% of by-product, and free of ethylene oxide. The overall heat-transfer coefficient of the reactor calculated from the heat balance was from 380 to 450 kcal./m$^2$ hr. ° C.

The reaction was continued satisfactorily for a long time without any trouble and the average particle size of the product was approximately 200$\mu$.

The vapor phase in the receiver was conducted to the fractionating column and refined ethylene oxide was recovered.

For the purpose of comparison, the reaction was carried out in a tube reactor instead of the above mentioned preheater and reactors under the condtions of a reaction temperature of 170° C., retention time of 3 minutes and pressure of 45 kg./cm.$^2$. The tube reactor was composed of pipe of 10 mm. in diameter and 50 m. in length, and was immersed in a cooling bath.

The composition of the product was BHET 42.5%, unreacted terephthalic acid 17.1%, oligomer and by-products 40.4%.

EXAMPLE 2

The apparatus in Example 1 was attached with the receiving device shown in FIG. 7 to the outlet of seal pot 11 in FIG. 1 was used. 500 kg. of terephthalic acid (particle size distribution mainly in range of 10–30$\mu$, and bulk density 0.20), 1060 kg. of ethylene oxide and 5 kg. of triethyl benzyl ammonium chloride were completely mixed in the mixing tank. The slurry was fed to the inlet of the reactor section at the rate of 1.5 liters/min. by means of diaphragm. The reaction was carried out under the conditions of a reaction temperature of 110° C., pressure of 22 kg./cm.$^2$ and retention time of 28 minutes.

The composition of the product which was taking out from the outlet of the seal pot was 35.1% of BHET, 54.8% of unreacted ethylene oxide, 9.5% of unreacted terephthalic acid and 0.6% of by-products.

Hot water having a temperature of 120° C. was fed through the inlet provided between the seal pot and reducing valve at the rate of 2.0 liters/min. and the reaction mixture was sprayed into the receiver.

The clear solution obtained by filtration of the liquid phase in the receiver was maintained at 90° C. and continuously led to fractionating column having a diameter of 5 cm. and a length of 2.5 m. and a helical coil in the interior thereof.

After stripping off the ethylene oxide, the solution was conducted to the storage tank. Highly pure crystalline BHET was obtained from the solution after cooling. In the process, 0.95% of fed ethylene oxide was hydrolyzed to ethylene glycol.

In contrast, when water was previously fed to slurry in the mixing tank instead of introducing the water just before blowing into receiver, 21.3% of fed ethylene oxide was hydrolyzed to ethylene glycol.

EXAMPLE 3

Five reactors similar to the embodiment shown in FIG. 4 were used in the apparatus in Example 1 in place of a preheater and connected reactors. Each reactor had 0.43 m.$^2$ of heating area, about 9 liters of actual interior volume and 4 rows of blades; the space between the edge of blade and the inside wall of inner shell was 0.5–1 mm.

80 kg. of terephthalic acid (particle size distribution is mainly in the range of 40–50$\mu$ and bulk density is 0.6), 127 kg. of ethylene oxide, 0.8 kg. of triethyl amine, 0.8 kg. of dimethyl terephthalate (the latter two were catalyst) were mixing completely in the mixed tank. The slurry was fed continuously to the inlet of the reactor section at the rate of 0.75 liter/min. The reaction took place under the conditions of a reaction temperature of 110° C., pressure of 23 kg./cm.$^2$, retention time of 55 minutes.

The composition of the product in the reciver was BHET 60.2%, unreacted terephthalic acid 39.2% and by-products 0.6%. Overall heat-transfer coefficient of the reactor calculated from heat balance of the reaction was 120–150 kcal./m.$^2$. hr. ° C., and the average particle size of the product was 160$\mu$. The reaction was continued satisfactorily for a long time without any trouble.

EXAMPLE 4

The same apparatus as described in Example 2 was used. The slurry consisting of 400 kg. of terephthalic acid (particle size distribution is mainly in range of 10–20$\mu$ and bulk density is 0.17), 850 kg. of ethylene oxide and 4 kg. of tetramethyl ammonium chloride (catalyst) was fed continuously to the inlet of the reactor section at the rate of 2.0 liters/min.

The reaction was carried out under conditions of a reaction temperature of 120° C., pressure of 25 kg./cm.$^2$ and retention time of 20 minutes.

The composition of the mixture in the seal pot was as BHET 32.8%, unreacted ethylene oxide 55.9%, unreacted terephthalate 9.8% and by-product 1.5%.

Hot water having a temperature of 110° C. was introduced through the inlet between the seal pot and the reducing valve at the rate of 0.8 liter/min. and the reaction mixture was sprayed into the receiver in which hot water was further introduced at the rate of 1.0 liter/min.

The clear solution filtered off from the unreacted terephthalic acid and maintained at 80° C. was continuously charged to the fractionating column to strip ethylene oxide and conducted to the storage tank and allowed to cool. The solution, contained 27 weight percent of BHET. Highly pure crystalline BHET was obtained by cooling the BHET precipitating in a yield of 93.2% based on consumed terephthalic acid.

The vapor was conducted to a fractionating column and ethylene oxide (moisture content 0.01%) was recovered. The hydrolysis ratio to ethylene glycol was 0.38%.

EXAMPLE 5

The same apparatus as described in Example 1 was used. The slurry consisting of 400 kg. of terephthalic acid (particle size distribution is mainly in a range of 30–50$\mu$ and bulk density is 0.6), 100 kg. BHET, 300 kg. of ethylene oxide and 4 kg. of triethyl amine (catalyst) was fed continuously to the inlet of the reactor section at the rate of 2.0 liters/min. The reaction was carried out under conditions of a reaction temperature of 105° C., pressure of 20 kg./cm.$^2$ and retention time of 20 minutes.

The composition of the reaction mixture in the receiver was BHET 75.2%, unreacted terephthalic acid 23.6%, by-product 1.2%. Yield of BHET based on consumed terephthalic acid was 93.7%.

After filtering off the terephthalic acid, cooling the filtrate yielded highly pure BHET.

What is claimed is:

1. A continuous process for preparing bis-($\beta$-hydroxyethyl)-terephthalate by reacting terephthalic acid with ethylene oxide under pressure and wherein said reaction products are discharged to the atmosphere comprising introducing into a reaction zone composed of at least one reactor maintained under positive pressure of 15 to 30 kg./cm.$^2$ a substantially solvent free mixture of terephthalic acid and at least a stoichiometric amount of ethylene oxide, heating the reaction mixture in said reaction zone under pressure to the temperature at which enthalpy of said reaction mixture exceeds the latent heat of evaporation of volatile materials contained therein to substantially complete the reaction, thereafter introducing said reaction mixture via a reducing valve which reduces the pressure of the reaction mixture to atmospheric pressure into an atmospheric receiver and directly discharging said bis-($\beta$-hydroxyethyl-terephthalate, and introducing hot water or steam into the reaction mixture prior to its introduction into the reducing valve or at the outlet of the reducing valve, each of said reactors comprising a jacketed cylindrical tube having a rotor arranged therein so as to extend over substantially the entire length of said reactor, said rotor having blades affixed thereto which are adapted for agitating and scraping off the film of reaction mixture on the inner wall of said reactor on rotation of said rotor.

2. A process according to claim 1 wherein said reducing valve is a needle valve having a wide outlet and wide seat ring.

3. A process according to claim 1 wherein said reaction zone is composed of a plurality of said reactors.

4. A process according to claim 1 wherein said pressure in said reaction zone exceeds the vapor pressure of the reaction mixture and said reaction temperature is below 130° C. and wherein said reaction mixture comprises 2 to 10 mols of ethylene oxide per mol of terephthalic acid.

5. A process according to claim 1 wherein said reaction mixture comprises 3 to 6 mols of ethylene oxide per mol of terephthalic acid.

6. A process according to claim 1 wherein said reaction zone additionally includes a pre-heater.

7. A process according to claim 1 wherein said blades are arranged on said rotor in at least two rows disposed parallel to said rotor with the outer edges of said blades facing toward and contacting the inner wall of said reactor.

8. A process according to claim 1 wherein said blades are arranged on said rotor in at least two rows with said blades loosely attached to said rotor in a direction tangential to said rotor with the outer edges of said blades facing toward and contacting the inner wall of said reactor.

References Cited

UNITED STATES PATENTS

| 3,459,788 | 8/1969 | Enoki et al. | 260—475 P |
| 3,617,226 | 11/1971 | List et al. | 260—475 P |

FOREIGN PATENTS

| 833,019 | 4/1960 | Great Britain | 260—515 |

LORRAINE A. WEINBERGER, Primary Examiner

E. J. SKELLY, Assistant Examiner